US012558915B2

(12) United States Patent
Raksha et al.

(10) Patent No.: US 12,558,915 B2
(45) Date of Patent: Feb. 24, 2026

(54) SECURITY INK BASED SECURITY FEATURE

(71) Applicant: VIAVI Solutions Inc., Chandler, AZ (US)

(72) Inventors: Vladimir P. Raksha, Santa Rosa, CA (US); Cornelis Jan Delst, Fairfax, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 0 days.

(21) Appl. No.: 18/488,258

(22) Filed: Oct. 17, 2023

(65) Prior Publication Data

US 2024/0042787 A1 Feb. 8, 2024

Related U.S. Application Data

(63) Continuation of application No. 17/583,404, filed on Jan. 25, 2022, now Pat. No. 11,833,849, which is a (Continued)

(51) Int. Cl.
*B42D 25/369* (2014.01)
*B41M 3/14* (2006.01)
(Continued)

(52) U.S. Cl.
CPC ........... *B42D 25/369* (2014.10); *B41M 3/148* (2013.01); *B42D 25/378* (2014.10); *B42D 25/41* (2014.10);
(Continued)

(58) Field of Classification Search
CPC .... B42D 25/369; B42D 25/378; B42D 25/41; B42D 25/23; B42D 25/24; B42D 25/29; B41M 3/148; B41M 3/14
(Continued)

(56) References Cited

U.S. PATENT DOCUMENTS 3,853,676 A 12/1974 Graves et al.
4,197,563 A 4/1980 Michaud
(Continued)

FOREIGN PATENT DOCUMENTS

AU 2012272129 A1 1/2014
CA 2707728 A1 6/2009
(Continued)

OTHER PUBLICATIONS

Extended European Search Report for Application No. EP24165748, mailed on Apr. 24, 2024, 6 pages.
(Continued)

*Primary Examiner* — Justin V Lewis
(74) *Attorney, Agent, or Firm* — Harrity & Harrity, LLP

(57) ABSTRACT

A security article may include a substrate. The security article may include a layer of security ink. The layer of security ink may include a set of color-shifting interference particles. The security article may include a layer of magnetic color-shifting ink. The layer of magnetic color-shifting ink may include a set of magnetically aligned magnetic particles. A color-shifting property of the layer of security ink and a color-shifting property of the layer of magnetic color-shifting ink may have a threshold level of similarity to create a color matching effect.

20 Claims, 11 Drawing Sheets

Related U.S. Application Data continuation of application No. 16/422,274, filed on May 24, 2019, now Pat. No. 11,241,901, which is a continuation of application No. 15/830,301, filed on Dec. 4, 2017, now Pat. No. 10,357,991.

(60) Provisional application No. 62/436,226, filed on Dec. 19, 2016.

(51) Int. Cl.
*B42D 25/23* (2014.01)
*B42D 25/24* (2014.01)
*B42D 25/29* (2014.01)
*B42D 25/378* (2014.01)
*B42D 25/41* (2014.01)

(52) U.S. Cl.
CPC .............. *B42D 25/23* (2014.10); *B42D 25/24* (2014.10); *B42D 25/29* (2014.10)

(58) Field of Classification Search
USPC .......................... 283/72, 82, 83, 94, 98, 901
See application file for complete search history.

(56) References Cited

U.S. PATENT DOCUMENTS

| | | | |
|---|---|---|---|
| 5,630,877 A | 5/1997 | Kashiwagi et al. | |
| 6,902,807 B1 | 6/2005 | Argoitia et al. | |
| 7,040,664 B2 | 5/2006 | Taylor et al. | |
| 7,047,883 B2 | 5/2006 | Raksha et al. | |
| 7,258,900 B2 | 8/2007 | Raksha et al. | |
| 7,300,695 B2 | 11/2007 | Argoitia et al. | |
| 7,517,578 B2 | 4/2009 | Raksha et al. | |
| 7,604,855 B2 | 10/2009 | Raksha et al. | |
| 7,717,038 B2 | 5/2010 | Raksha et al. | |
| 7,729,026 B2 | 6/2010 | Argoitia et al. | |
| 7,922,209 B1 | 4/2011 | Beretta et al. | |
| 7,934,451 B2 | 5/2011 | Raksha et al. | |
| 8,039,093 B2 | 10/2011 | Leenders et al. | |
| 8,064,632 B2 | 11/2011 | Baloukas et al. | |
| 8,132,736 B2 | 3/2012 | Wild et al. | |
| 8,137,762 B2 | 3/2012 | Raksha et al. | |
| 8,211,509 B2 | 7/2012 | Raksha et al. | |
| 8,211,531 B2 | 7/2012 | Schmid et al. | |
| 8,287,989 B2 | 10/2012 | Raksha et al. | |
| 8,343,615 B2 | 1/2013 | Raksha et al. | |
| 8,726,806 B2 | 5/2014 | Raksha et al. | |
| 9,470,458 B1 | 10/2016 | Martin et al. | |
| 9,701,151 B2 | 7/2017 | Camus et al. | |
| 9,724,957 B2 | 8/2017 | Lefebvre et al. | |
| 10,357,991 B2 | 7/2019 | Raksha | |
| 11,241,901 B2 | 2/2022 | Raksha et al. | |
| 2002/0160194 A1 | 10/2002 | Phillips et al. | |
| 2006/0035080 A1 | 2/2006 | Argoitia | |
| 2006/0115110 A1 | 6/2006 | Rodriguez et al. | |
| 2006/0194040 A1 | 8/2006 | Raksha et al. | |
| 2007/0200002 A1* | 8/2007 | Raksha | B42D 25/378 235/494 |
| 2008/0024847 A1 | 1/2008 | Kittler, Jr. et al. | |
| 2008/0171144 A1 | 7/2008 | Raksha et al. | |
| 2009/0184169 A1 | 7/2009 | Degott et al. | |
| 2009/0200791 A1 | 8/2009 | Despland et al. | |
| 2010/0040845 A1 | 2/2010 | Schmid et al. | |
| 2010/0170408 A1 | 7/2010 | Gygi et al. | |
| 2011/0260442 A1 | 10/2011 | Chalifoux | |
| 2011/0298207 A1 | 12/2011 | Despland et al. | |
| 2012/0205905 A1 | 8/2012 | Degott et al. | |
| 2012/0326430 A1 | 12/2012 | Kohlmann et al. | |
| 2013/0093174 A1 | 4/2013 | Downing et al. | |
| 2013/0147179 A1 | 6/2013 | Baloukas et al. | |
| 2013/0172048 A1 | 7/2013 | Rodriguez et al. | |
| 2014/0077485 A1* | 3/2014 | Raksha | B44F 1/10 283/67 |
| 2014/0210200 A1 | 7/2014 | Bornschlegl et al. | |
| 2015/0231912 A1 | 8/2015 | Yoon et al. | |
| 2015/0321449 A1 | 11/2015 | Filipp | |
| 2015/0321499 A1 | 11/2015 | Argoitia et al. | |
| 2016/0187546 A1 | 6/2016 | Raksha et al. | |
| 2016/0339474 A1 | 11/2016 | Degott et al. | |
| 2022/0143997 A1 | 5/2022 | Raksha et al. | |

FOREIGN PATENT DOCUMENTS

| | | |
|---|---|---|
| CA | 2791199 A1 | 9/2011 |
| CN | 1505668 A | 6/2004 |
| CN | 1853961 A | 11/2006 |
| CN | 101011916 A | 8/2007 |
| CN | 101903183 A | 12/2010 |
| CN | 102224015 A | 10/2011 |
| CN | 103268657 A | 8/2013 |
| CN | 103338871 A | 10/2013 |
| CN | 103476596 A | 12/2013 |
| CN | 103748284 A | 4/2014 |
| CN | 103963352 A | 8/2014 |
| CN | 104066592 A | 9/2014 |
| CN | 104497714 A | 4/2015 |
| CN | 104813338 A | 7/2015 |
| CN | 105082713 A | 11/2015 |
| CN | 106170397 A | 11/2016 |
| EP | 1669213 A1 | 6/2006 |
| EP | 1780040 A2 | 5/2007 |
| EP | 1806238 A2 | 7/2007 |
| EP | 1854642 A2 | 11/2007 |
| EP | 1854852 A1 | 11/2007 |
| EP | 2965920 A1 | 1/2016 |
| JP | 2009514694 A | 4/2009 |
| KR | 20160083578 A | 7/2016 |
| TW | 201435003 A | 9/2014 |
| TW | I835308 B | 3/2024 |
| WO | 2008139373 A1 | 11/2008 |
| WO | 2010037638 A2 | 4/2010 |
| WO | 2010058026 A2 | 5/2010 |
| WO | 2010066838 A1 | 6/2010 |
| WO | 2010115928 A2 | 10/2010 |
| WO | 2011012520 A2 | 2/2011 |
| WO | 2011092502 A2 | 8/2011 |
| WO | 2011107271 A1 | 9/2011 |
| WO | 2012175212 A1 | 12/2012 |
| WO | 2013106470 A1 | 7/2013 |
| WO | 2015082344 A1 | 6/2015 |
| WO | 2015121028 A1 | 8/2015 |

OTHER PUBLICATIONS

Datacolor, "Metamerism," 2009, 2 pages.
Extended European Search Report for Application No. EP17206793, mailed on Apr. 5, 2018, 7 pages.
Extended European Search Report for Application No. EP20174029.7, mailed on Sep. 29, 2020, 6 pages.
Extended European Search Report for Application No. EP22151406.0, mailed on Aug. 29, 2022, 7 pages.
Hernandez S.M., "Estudio de la dinamica en Suspensiones magneto-reologicas sometidas a campos externos mediante el uso de tecnicas opticas. procesos de agregacion, formacion de estructuras y su evolucion espacio-temporal," Apr. 2, 2002, 10 pages. Retrieved from Internet: [URL:https://www.infouniversidad.es/tesis-doctorales/fisica/estudio-de-la-dinamica-en-suspensiones-magnet . . . .
Itti L., "Visual Salience," Sep. 7, 2007, 9 pages. Retrieved from Internet: [URL: http://www.scholarpedia.org/article/Visual_salience].
Schmidt M., "Security which Ornaments," Oct. 2007, 2 pages. Retrieved from Internet: [URL: http://www.eng.vodyanoyznak.ru/magazine/1/31.htm].
Van Renesse R.L., "Optical Document Security," 2005, 6 pages.
Wikipedia., "Visual Search," Apr. 16, 2018, 15 pages.Retrieved from Internet: [URL:https://en.wikipedia.org/wiki/Visual_search].

* cited by examiner

SECURITY INK BASED SECURITY FEATURE

RELATED APPLICATION(S)

This application is a continuation of U.S. patent application Ser. No. 17/583,404, filed Jan. 25, 2022, which is a continuation of U.S. patent application Ser. No. 16/422,274, filed May 24, 2019 (now U.S. Pat. No. 11,241,901), which is a continuation of U.S. patent application Ser. No. 15/830,301, filed Dec. 4, 2017 (now U.S. Pat. No. 10,357,991), which claims priority under 35 U.S.C. § 119 to U.S. Provisional Patent Application No. 62/436,226, filed on Dec. 19, 2016, the contents of which are incorporated herein by reference in their entireties.

BACKGROUND

Printing techniques may be utilized to print security articles, such as banknotes, checks, passports, postage stamps, identity cards, driver's licenses, or the like with a feature that is utilized to prevent forgery or counterfeiting. For example, a watermark may be present in a banknote substrate (e.g., paper money), and may be visible when the banknote is viewed with backlighting. Similarly, a security ink, such as a color-shifting ink, may be utilized to print a portion of a security article. For example, a portion of a security article of paper currency may be printed with an optically variable color-changing ink that causes a viewer to observe a first color when viewing the security article at a first angle and a second color when viewing the security article at a second angle. In this way, the user can determine that the security article is genuine (e.g., not counterfeit or forged). However, a user may be unaware that a particular security feature, such as optically variable color-changing ink, has been incorporated into a security article, and may fail to check the security article for the particular security feature, thus limiting the effectiveness of the particular security feature.

SUMMARY

According to some possible implementations, a security article may include a substrate. The security article may include a layer of security ink. The layer of security ink may include a set of color-shifting interference particles. The security article may include a layer of magnetic color-shifting ink. The layer of magnetic color-shifting ink may include a set of magnetically aligned magnetic particles. A color-shifting property of the layer of security ink and a color-shifting property of the layer of magnetic color-shifting ink may have a threshold level of similarity to create a color matching effect.

According to some possible implementations, a method may include printing a first security ink layer onto a substrate of a security article. The first security ink layer may include a first set of particles. The first security ink layer may include a first pigment with a first concentration. The method may include printing a second security ink layer onto the first security ink layer. The second security ink layer may include a second set of particles. The second security ink layer may include a second pigment with a second concentration. The second security ink layer and the first security ink layer may share a color-shifting property. The method may include exposing the security article to a magnetic field to magnetic ally orient the second set of particles. The method may include curing the second security ink layer to fix an orientation of the second set of particles based on magnetically orienting the second set of particles.

According to some possible implementations, a security article may include a substrate. The security article may include a dynamic security feature printed onto the substrate. The dynamic security feature may include a magnetically aligned security ink exhibiting a dynamic optical effect when exposed to a light source at a plurality of orientations relative to an observer. The security article may include a static security feature printed onto the substrate within a threshold proximity to the dynamic security feature. The static security feature may printed on top of the dynamic security feature, underneath the dynamic security feature, or adjacent to the dynamic security feature. The static security feature may include a color-shifting ink exhibiting a static optical effect when exposed to the light source at the plurality of orientations relative to the observer.

DETAILED DESCRIPTION

The following detailed description of example implementations refers to the accompanying drawings. The same reference numbers in different drawings may identify the same or similar elements.

A device banknote may include a security feature, such as a watermark or the like, in a security article of paper currency. A person may inspect or a bill validator device may analyze the security article to determine that the watermark is present in the security article. Based on identifying the watermark, the person may be confident or the bill validator device may determine that the security article is genuine. For example, a person may view a watermark in a dollar bill and may conclude that the dollar bill is not counterfeit.

However, the person may not know that a particular security article includes a particular security feature. For example, the person may not realize that a color-shifting ink is utilized to print a portion of a dollar bill and may, thus, fail to attempt to verify that the color-shifting ink is present by rotating or tilting the dollar bill. Implementations, described herein, may utilize a metameric security feature to facilitate determination of the veracity of a security article, such as a banknote, a check, a passport, a driver's license, a legal document, or the like. Moreover, based on including a dynamic security feature, such as the metameric security feature, within a threshold proximity of a static security feature, a likelihood that a person fails to inspect the static security feature is reduced. In this way, a likelihood of a security article being fraudulently passed off as genuine is reduced. Thus, implementations, described herein, improve the color contrast of a color shifting color shifting security feature and improve recognition and the likelihood that a user will notice a simulation of the feature.

Figure 1A:
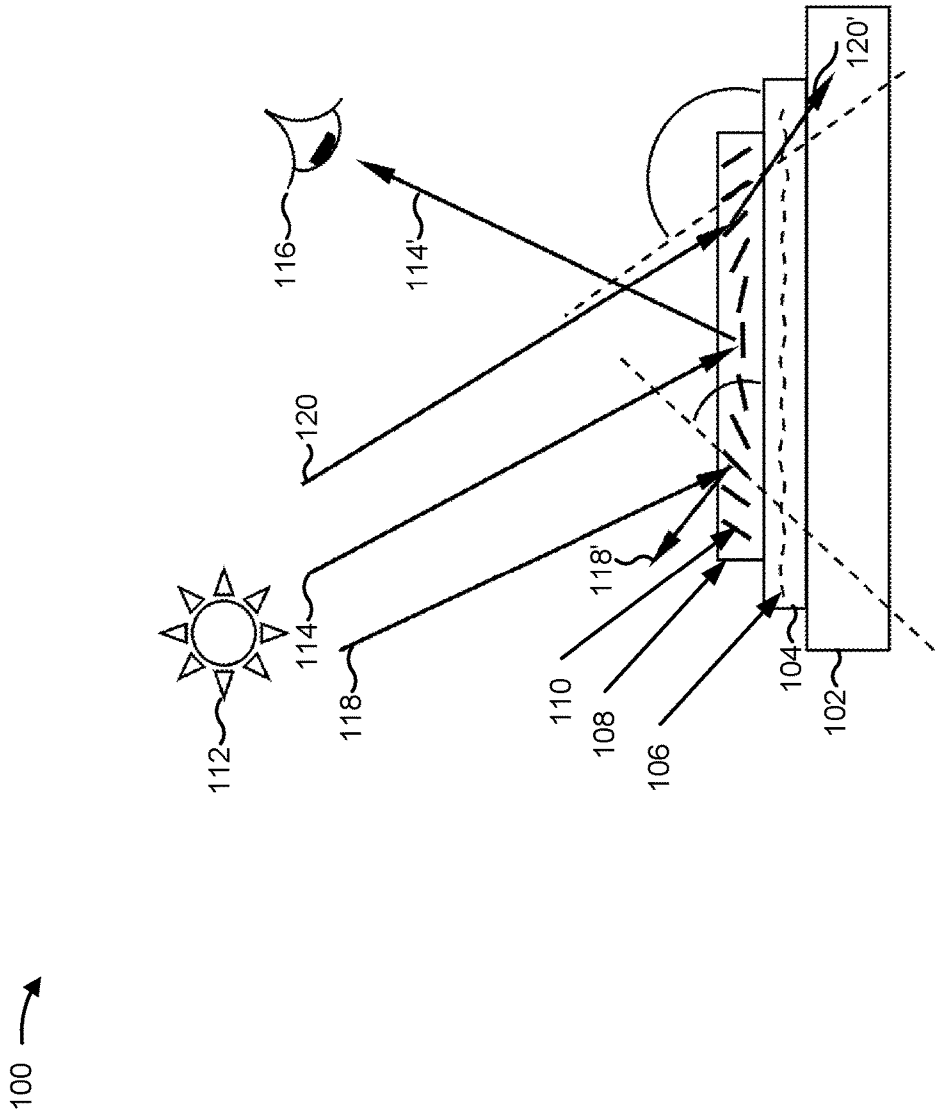
FIGS. 1A and 1B are diagrams relating to an example implementation described herein.
Figure 1B:
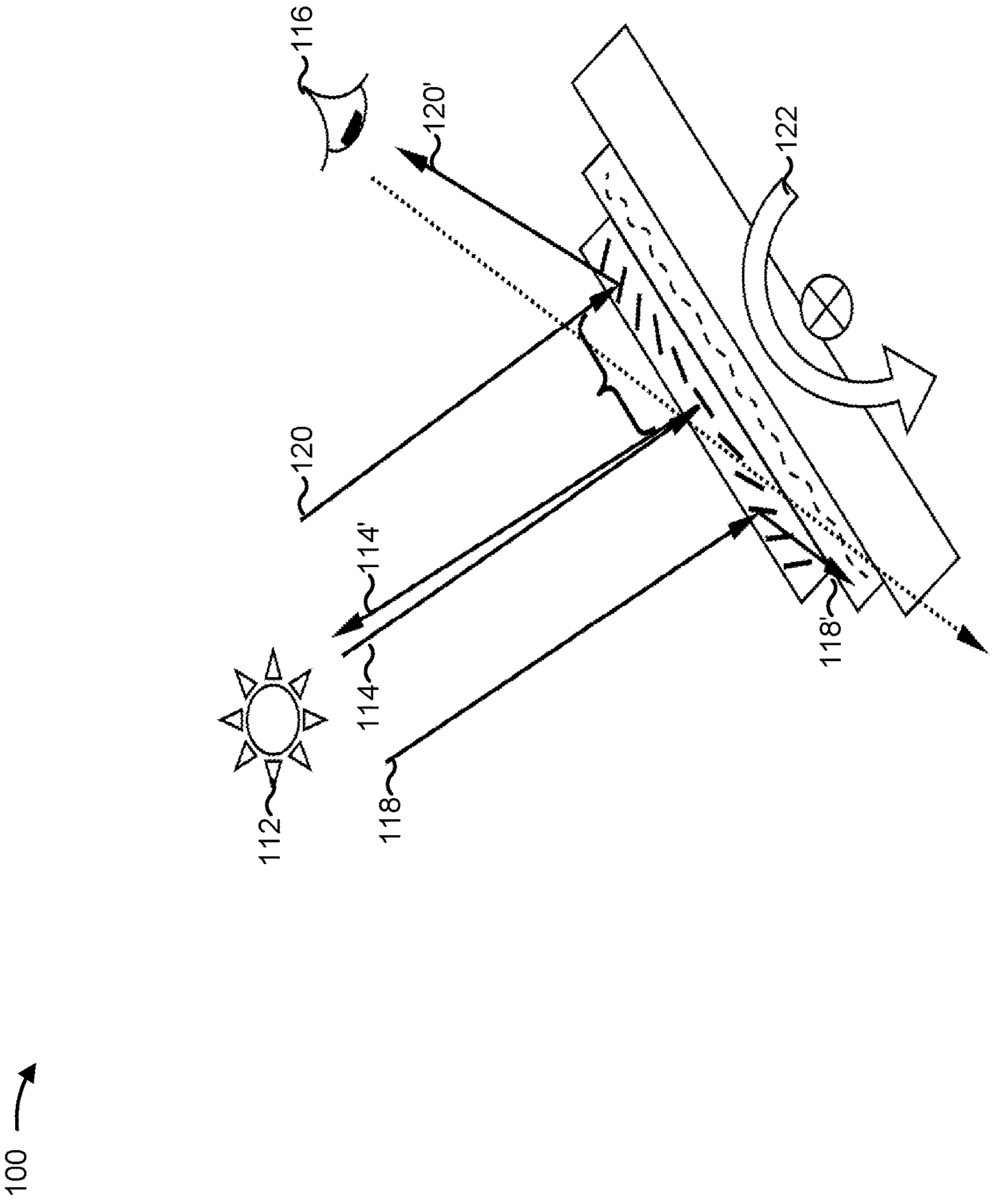

FIGS. 1A and 1B are diagrams of an overview of an example implementation 100 described herein. As shown in FIG. 1A, example implementation 100 includes a security article 102.

As further shown in FIG. 1A, and by reference number 104, security article 102 is coated with a security ink layer 104. In some implementations, security ink layer 104 may include an optically variable ink printed onto a surface of security article 102. For example, security ink layer 104 includes a set of color-shifting interference particles 106 (e.g., pigment particles). In some implementations, particles 106 form a Fabry-Perot interference filter to cause a color-shifting effect. In some implementations, particles 106 are oriented non-parallel to a substrate (e.g., a surface of security article 102).

In some implementations, particles 106 may include a set of magnetic particles. For example, when particles 106 are magnetic particles, security ink layer 104 may be exposed to a two-axial magnetic field to provide a flat alignment (e.g., substantially parallel to the surface of security article 102) of a set of particles 106. As shown, security ink layer 104 is coated with a security ink layer 108. Security ink layer 108 may include a magnetic color-shifting ink that includes a set of magnetically aligned magnetic particles 110. In this case, security ink layer 108 may be a layer of magnetic color-shifting ink. In some implementations, security ink layer 104 and security ink layer 108 may be a color matching or a metameric pair to cause security article 102 to exhibit a color matching or a metameric effect. For example, security ink layer 104 and security ink layer 108 may be associated with pigments with substantially similar color-shifting properties (e.g., the pigments each shift from approximately a first color to approximately a second color, such as from within an at least 10 deltaE similar first color to an at least 10 deltaE similar second color, from within an at least 10 deltaE similar first color to an at least 10 deltaE similar second color, or the like, based on a shift of a particular angle) to cause security ink layer 104 to color match security ink layer 108. Additionally, or alternatively, security ink layer 104 and/or security ink layer 108 may contain one or more dyes or pigments to cause color matching or metamerism between security ink layer 104 and/or security ink layer 108.

Security article 102 (and security ink layer 108) may be exposed to an external magnetic field during manufacture to cause particles 110 to be magnetically aligned to a direction of the magnetic field. In some implementations, particles 110 may be linearly aligned (e.g., based on a static magnetic field), circularly aligned (e.g., based on a rotating magnetic field), or the like. In some implementations, security ink layer 108 may be exposed to a curing procedure during manufacture. For example, security ink layer 108 may be exposed to an energy source, such as an ultraviolet (UV) light source, which may cause an organic binder of security ink layer 108 to solidify, thereby fixing particles 110 inside security ink layer 108 and in alignment with the direction of the magnetic field. In this way, a dynamic security feature, such as a rolling bar effect, a three-dimensional illusion effect, or the like may be incorporated into security article 102.

As further shown in FIG. 1A, when security article 102 is exposed to a light source 112 (e.g., a natural light source, such as the sun, or an artificial light source, such as a light bulb), a light ray 114 may reflect off a particle 110 resulting in light ray 114' being directed toward observer 116 (e.g., a person, a photodetector, or the like). In contrast, light rays 118/118' and 120/120' are substantially parallel as incoming light rays and are reflected away from observer 116 by particles 110 as a result of particles 110 being aligned in the direction of the magnetic field rather than parallel to a substrate of security article 102. In this case and at this orientation of security article 102 relative to light source 112 and observer 116, security ink layer 108 appears as a bright reflective band in a region corresponding to light ray 114/114' and as a dark non-reflective band in regions corresponding to light rays 118/118' and 120/120'. In some implementations, security ink layer 104 and security ink layer 108 may be associated with particular concentrations of pigment. For example, security ink layer 108 may include a pigment concentration satisfying a particular threshold to cause particles 110 to be separated by a threshold distance. In this way, light reflecting off particles 106 may be directed toward observer 116 through security ink layer 108.

As shown in FIG. 1B, and by reference number 122, security article 102 is rotated (e.g., by observer 116) to change the orientation of security article 102 relative to light source 112 and observer 116. In this case, light rays 114/114' and 118/118' are reflected away from observer 116 by particles 110, resulting in the regions of security article 102 corresponding to light rays 114/114' and 118/118' appearing as dark non-reflective bands. In contrast, light ray 120/120' is reflected toward observer 116, resulting in the region corresponding to light ray 120/120' appearing as a bright reflective band. Based on a gradual (e.g., continuous or substantially continuous) shift (e.g., a shift of a threshold displacement at a threshold angle shift) of the region of security article 102 that appears as bright and reflective, a rolling bar effect is created by security article 102. In other words, the bright reflective band shifts in position as security article 102 is rotated relative to light source 112 and observer 116. A security feature that exhibits the rolling bar effect, such as shown for security article 102 may be termed a dynamic security feature. Based on observing the rolling bar effect, observer 116 may determine that security article 102 includes a security layer 108 and is, thus, genuine.

As indicated above, FIGS. 1A and 1B are provided merely as an example. Other examples are possible and may differ from what was described with regard to FIGS. 1A and 1B.

In this way, a security article may include a set of layers of security ink to form a metameric effect for a security feature of the security article. Based on including a color matching or metameric effect for the security article, a likelihood of a viewer inspecting the security feature is improved relative to another type of security feature, thereby improving security of the security article.

Figure 2A:
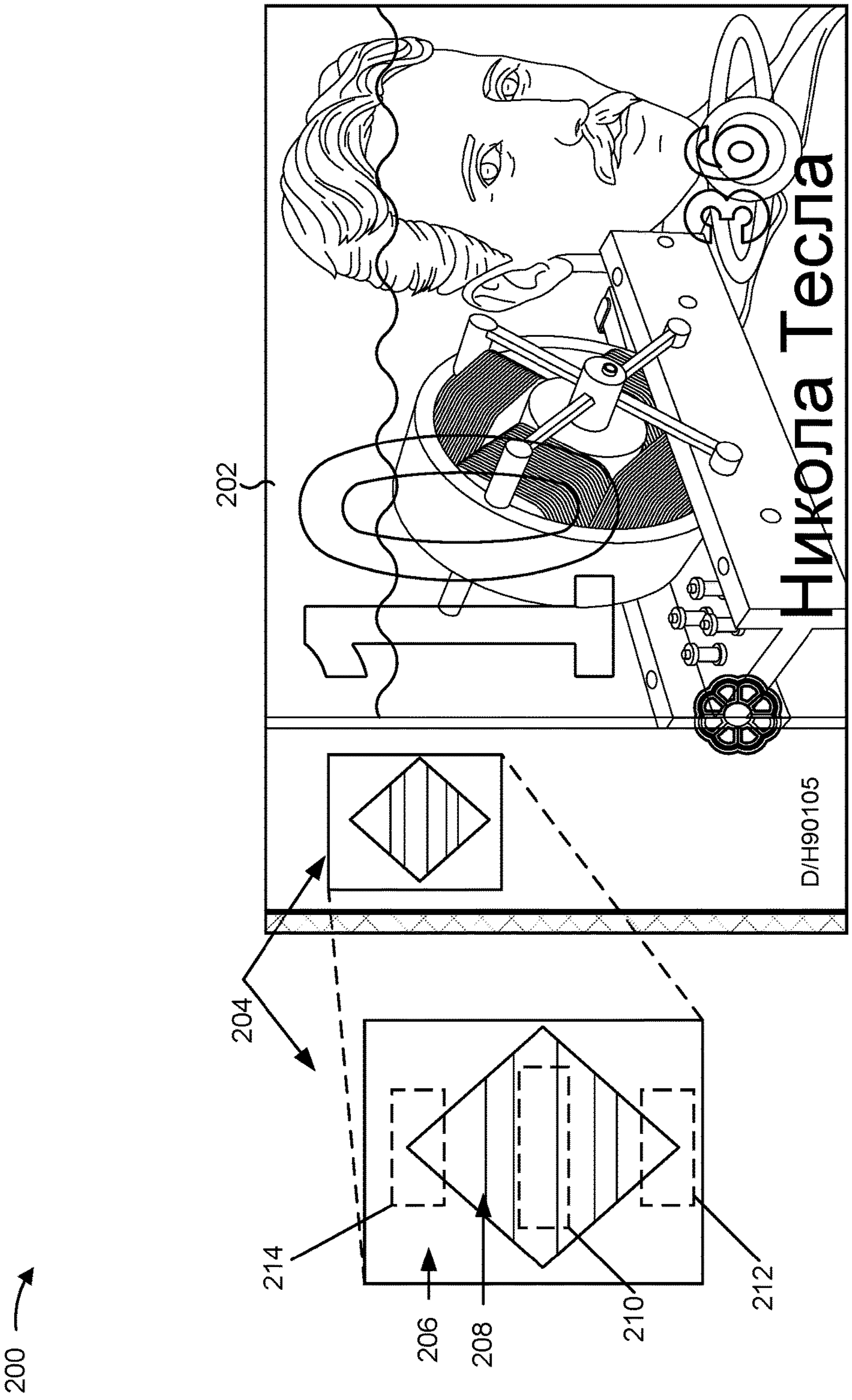
FIGS. 2A-2C are diagrams of an example implementation of a metameric effect security article, as described herein.
Figure 2B:
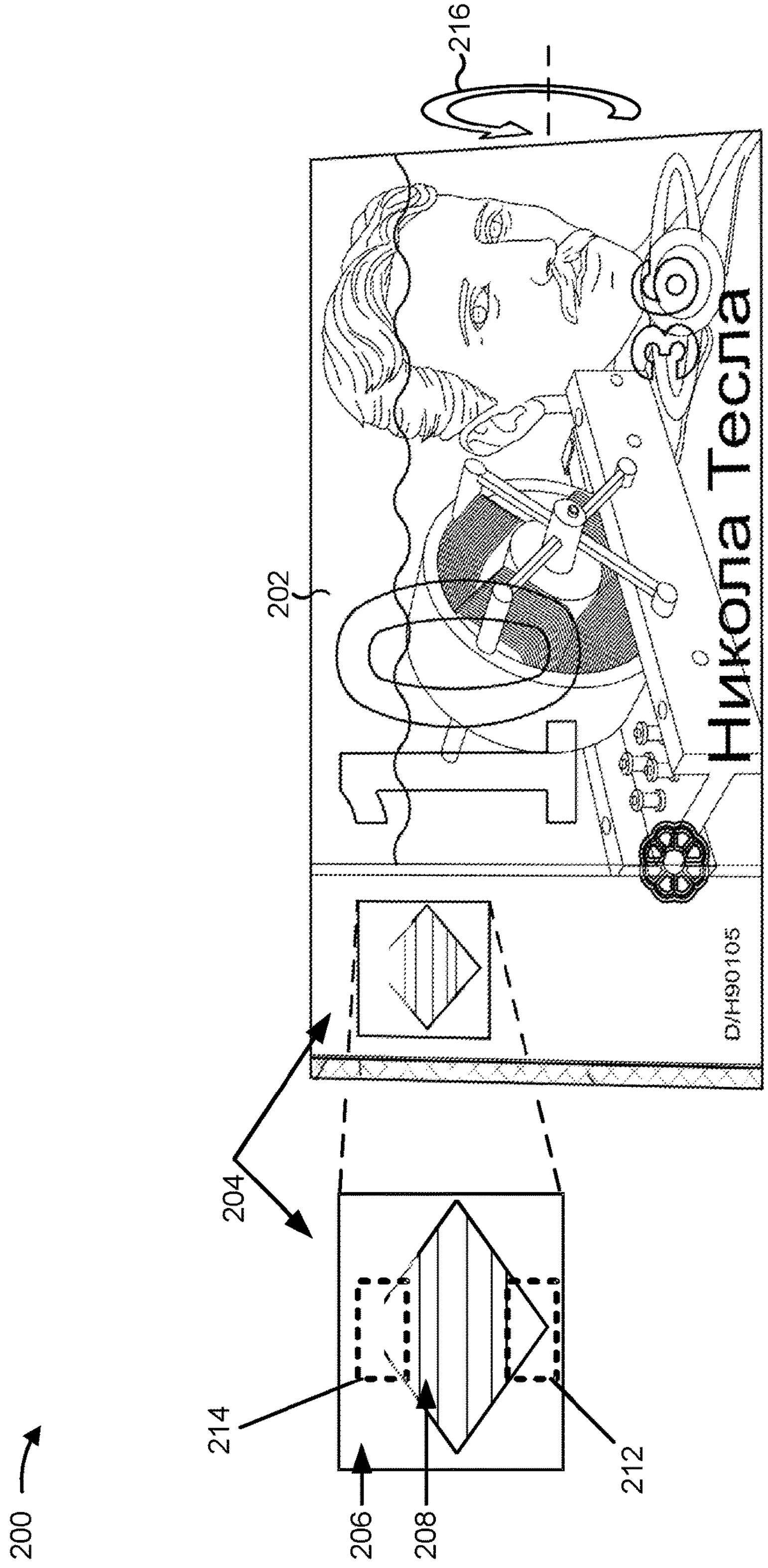
Figure 2C:
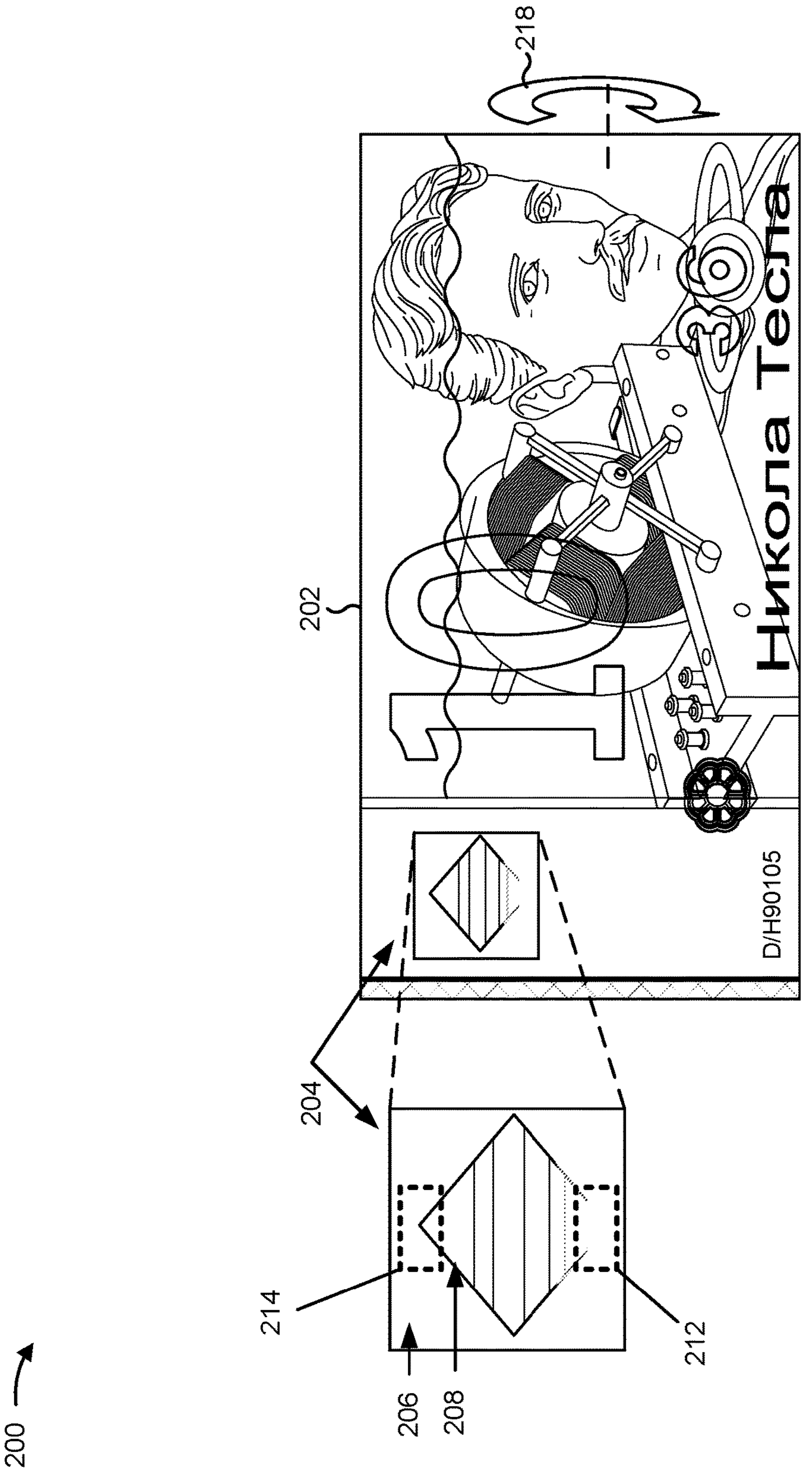

FIGS. 2A-2C are diagrams of an example implementation 200 of a color matching effect security article described herein. Example implementation 200 shows an example of the color matching effect security article with a particular security feature.

As shown in FIG. 2A, a security article 202 may include a security feature 204 that exhibits the rolling bar effect (i.e., a dynamic security feature). Security feature 204 includes a first region 206 and a second region 208. Second region 208 may correspond to security ink layer 108 of security article 102 shown in FIGS. 1A and 1B. In some implementations, a pigment concentration of pigment in the security ink in second region 208 may range from approximately 10% to approximately 35% by weight, may range from approximately 15% to approximately 25% by weight, may be approximately 20% by weight, or the like. Similarly, first region 206 may correspond to security ink layer 104, and may include a pigment concentration in the security ink of first region 206 in a range of approximately 5% to approximately 15% by weight, in a range from approximately 8% to approximately 13% by weight, at approximately 10% by weight, or the like. At a first orientation relative to a light source and an observer (not shown), security feature 204 appears with a bright portion, indicated by reference number 210, and a set of darker portions indicated by reference numbers 212 and 214.

As shown in FIG. 2B, and by reference number 216, security article 202 is rotated to a second orientation relative to a light source and an observer (not shown). In this case, the portion indicated by reference number 212 appears as a bright portion of security feature 204 as a result of the rolling bar effect. Similarly, the portion indicated by reference number 214 may appear as dark portions of security feature 204. In some implementations, pigments of first region 206 and second region 208 may be selected as a color matching or metameric pair to cause first region 206 and second region 208 to appear as substantially the same color when the rolling bar effect results in a particular portion reflecting light away from the observer. In other words, the dark portion of second region 208 indicated by reference number 214 may match first region 206 at the orientation shown in FIG. 2B. For example, the change in orientation results in region 214 appearing to be of the same shade or color in second region 208 as in first region 206. This color matching may be termed a simple color match or a metameric effect (other metameric effects include illuminant metamerism and observer metamerism).

As shown in FIG. 2C, and by reference number 218, security article 202 is rotated to a third orientation relative to a light source and an observer (not shown). In this case, the portion indicated by reference number 214 appears as a bright portion rather than being a dark portion of security feature 204 as a result of the rolling bar effect. Furthermore, the change in orientation results in the portion of second region 208 indicated by reference number 214 appearing to be of the same shade or color as first region 206.

In some implementations, the rolling bar effect may be aligned horizontally with regard to security article 202, as shown, to cause the rolling bar to move vertically with regard to security article 202. In this way, a viewer may be more likely to notice the rolling bar relative to another type of orientation.

As indicated above, FIGS. 2A-2C are provided merely as an example. Other examples are possible and may differ from what was described with regard to FIGS. 2A-2C.

Figure 3A:
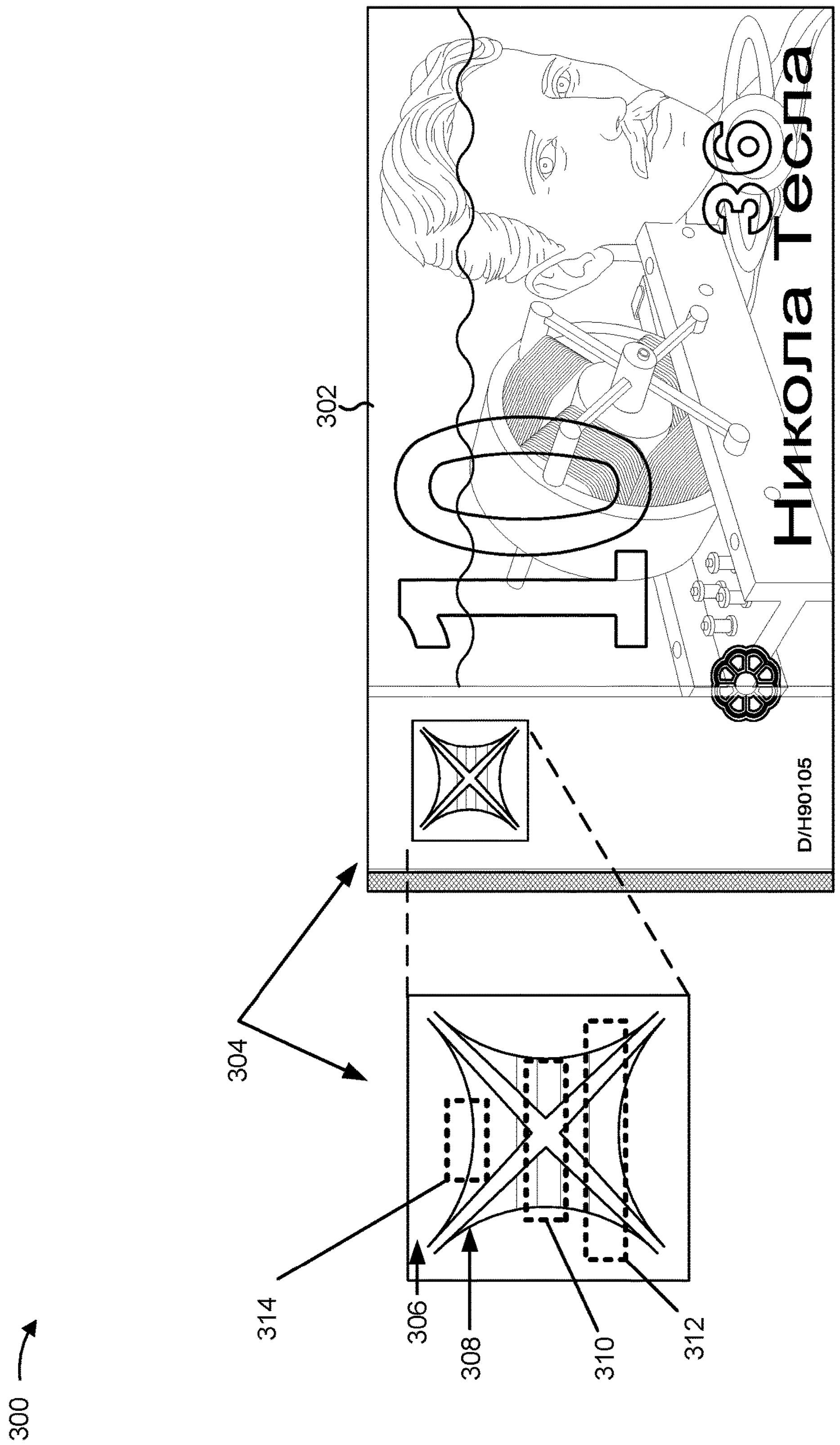
FIGS. 3A and 3B are diagrams of another example implementation of a metameric effect security article, described herein.
Figure 3B:
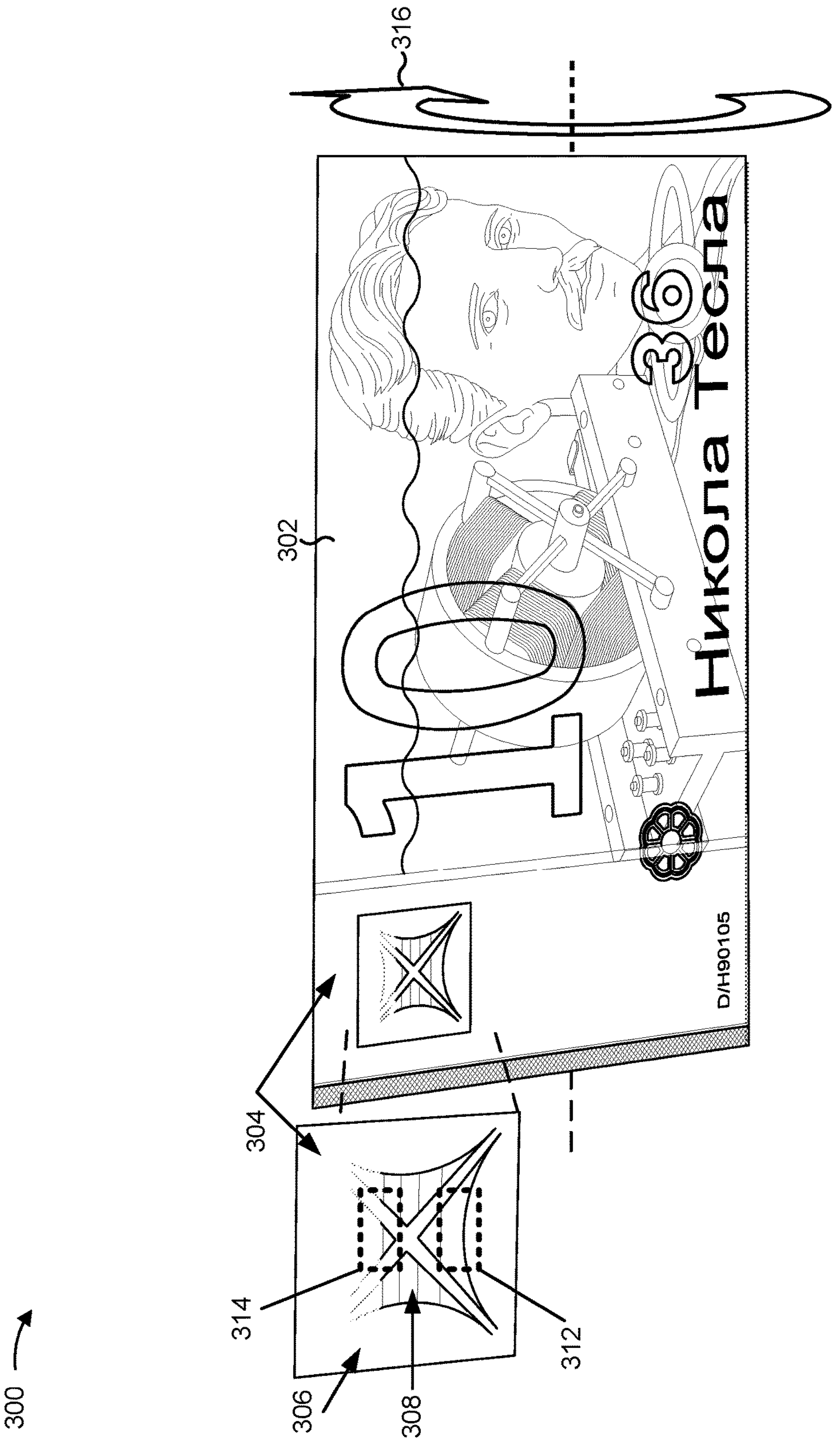

FIGS. 3A and 3B are diagrams of an example implementation 300 of a metameric effect security article described herein. Example implementation 300 shows an example of the metameric effect security article with a particular security feature.

As shown in FIG. 3A, a security article 302 may include a security feature 304 that exhibits the rolling bar effect. Security feature 304 includes a first region 306 and a second region 308. Second region 308 may correspond to security ink layer 108 of security article 102 shown in FIGS. 1A and 1B. In some implementations, security ink of first region 306 and second region 308 may be selected to cause a metameric effect. For example, the security ink of first region 306 and second region 308 may be selected to cause, at a first orientation, a color of a portion of second region 308 indicated by reference number 310 to match a color of first region 306 at a position of the rolling bar in second region 308. In contrast, portions of second region 308 indicated by reference numbers 312 and 314 appear as a darker color than the color of first region 306.

As shown in FIG. 3B, and by reference number 316, security article 302 is rotated to a second orientation relative to a light source and an observer (not shown). In this case, region 314 appears with a bright band rather than being a dark portion of security feature 304 as a result of the rolling bar effect. In some implementations, region 314 may be the same or may be substantially the same (i.e., within a threshold color similarity, such as within 15 deltaE, within 10 deltaE, within 5 delta E, within 1 deltaE, or the like, on a pigment measurement scale) color to first region 306.

As indicated above, FIGS. 3A and 3B are provided merely as an example. Other examples are possible and may differ from what was described with regard to FIGS. 3A and 3B.

Figure 4A:
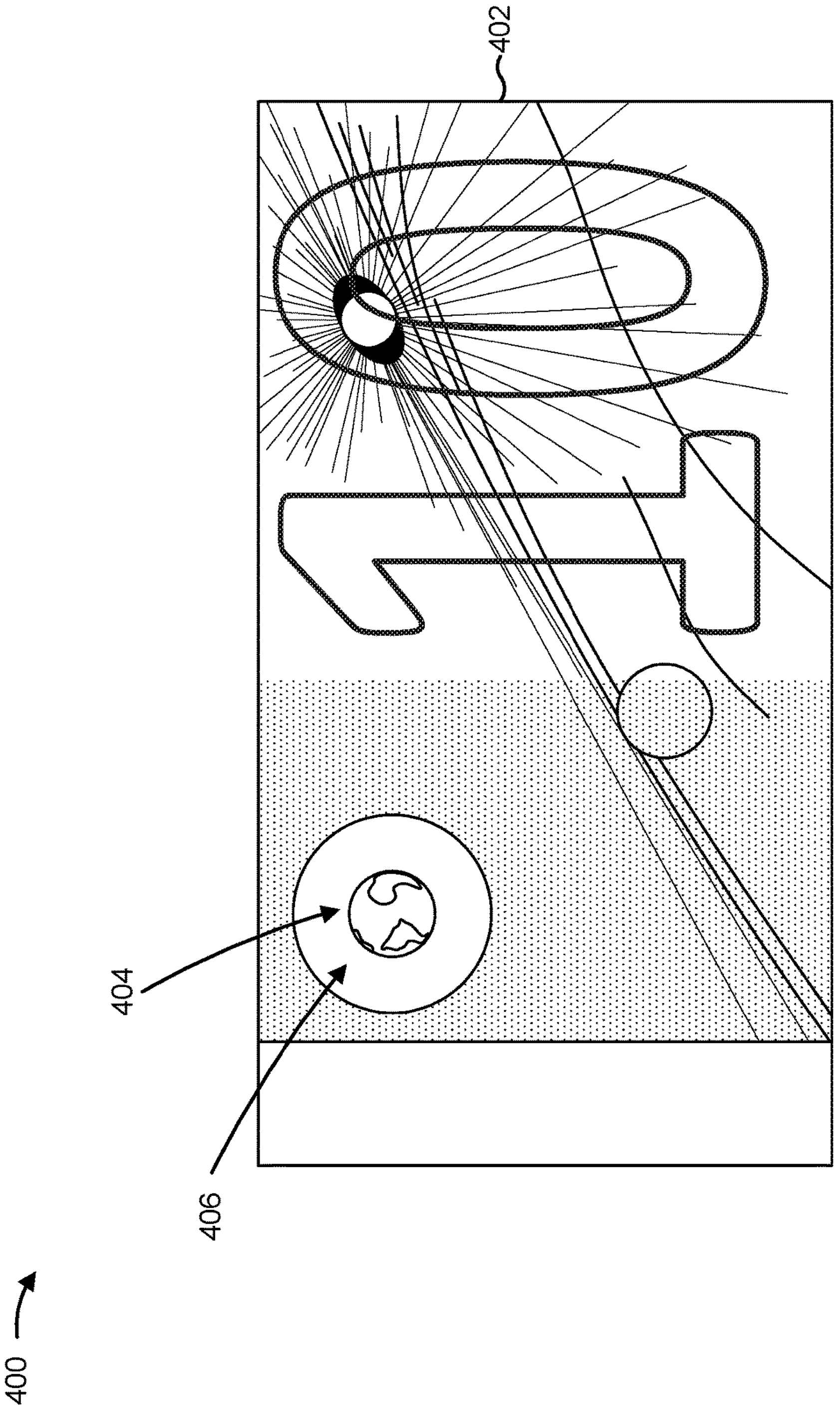
FIGS. 4A-4C are diagrams of yet another example implementation of a metameric effect security article, as described herein.
Figure 4B:
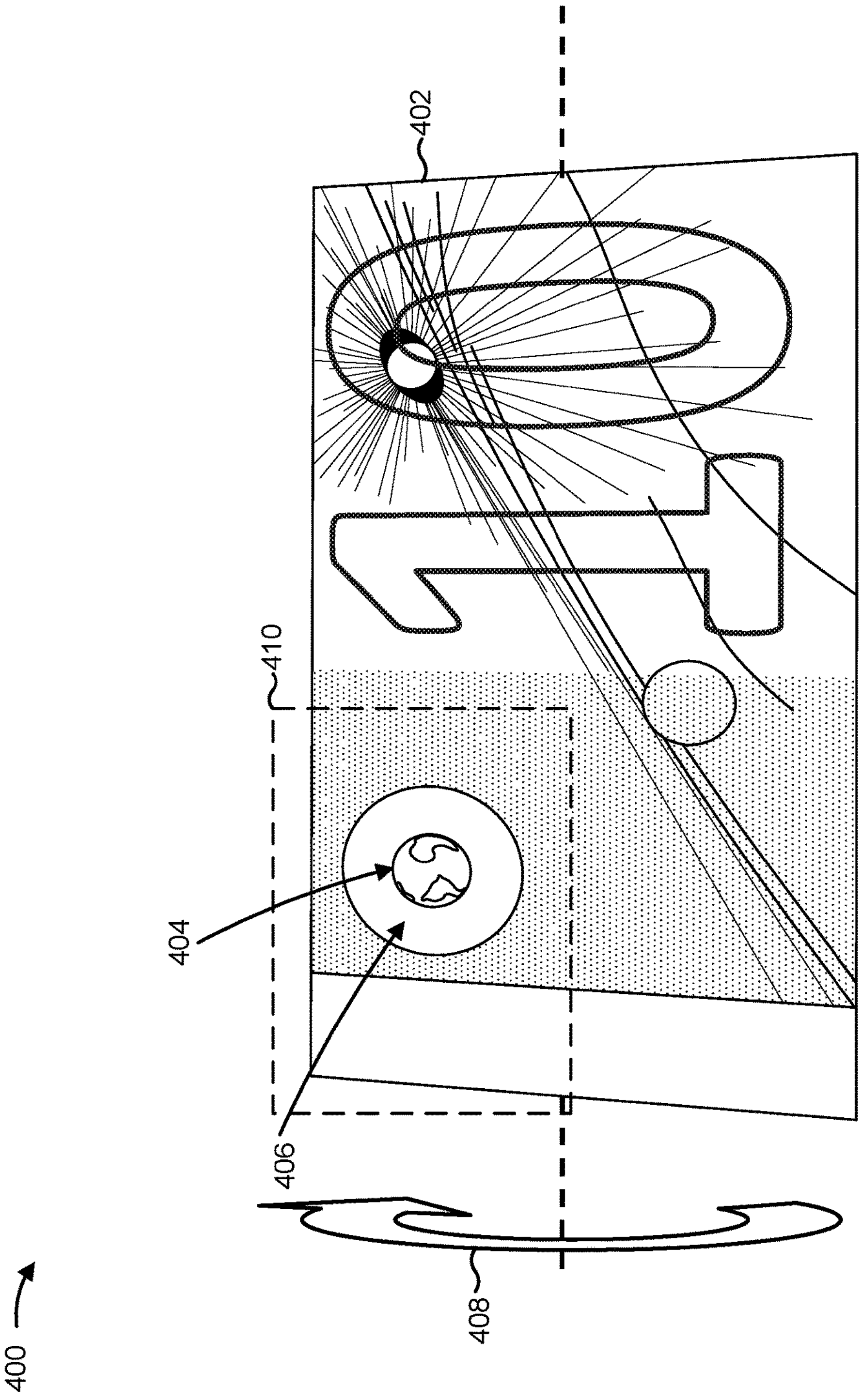
Figure 4C:
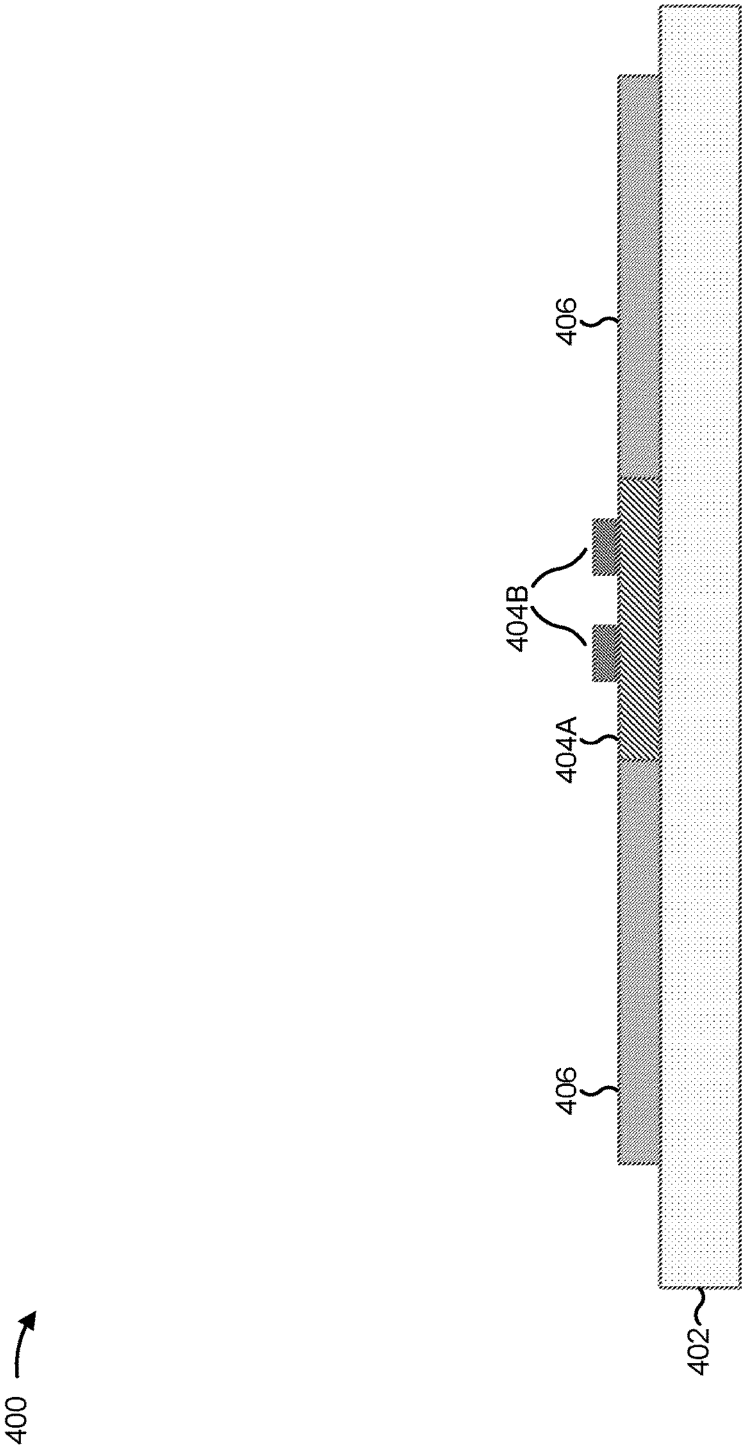

FIGS. 4A-4C are diagrams of an example implementation 400 of an implementation described herein. Example implementation 400 shows an example of a metameric effect security article with a security feature.

As shown in FIG. 4A, security article 402 includes a dynamic security feature 404 and a static security feature 406. Dynamic security feature 404 may refer to a set of layers of magnetic ink oriented by magnetic field to produce a dynamic effect (i.e., a rolling bar effect, a three-dimensional illusion effect, or the like). In this case, dynamic security feature 404 may be manufactured using a rotating magnetic field to magnetically orient particles of dynamic security feature 404 to form a parabolic convex Fresnel reflector. The parabolic convex Fresnel reflector results in dynamic security feature 404 appearing as a three-dimensional illusion. In other words, dynamic security feature 404 appears as a three-dimensional globe of the Earth and a bright portion of the three-dimensional globe appears to shift from the north pole of the Earth to the south pole of the Earth when security article 402 is shifted from a first orientation to a second orientation. As shown in FIG. 4A at the first orientation, the north pole of the Earth appears illuminated (e.g., by sunlight).

In some implementations, dynamic security feature 404 and static security feature 406 may be non-overlapping security features. For example, first ink may be printed onto a first region of security article 402 to form dynamic security feature 404 and second ink may be printed onto a second, non-overlapping region of security article 402 to form static security feature 406. In this way, an amount of ink that is used is reduced relative to printing ink in overlapping regions. In some implementations, the first region and the second region may be partially overlapping. In some implementations, the first region and the second region may be contiguous. In some implementations, the first region and the second region may be within a threshold proximity.

In some implementations, static security feature 406 may be a solid (i.e., contiguous) region of ink. For example, the second region may include a contiguous deposition of the second ink to form a solid region of color rather than a line-art region of color, a patterned region of color, or the like. In some implementations, static security feature 406 may be formed from non-magnetic particles and dynamic security feature 404 may be formed from magnetic particles, and the magnetic particles may form an image contiguous to a solid region of color formed from the non-magnetic particles. In some implementations, static security feature 406 and dynamic security feature 404 may be within a threshold proximity of an edge of security article 402, such as within 20 millimeters, within 10 millimeters, within 5 millimeters, within 1 millimeter, or the like. In this case, utilization of dynamic security feature 404 may call attention to static security feature 406 based on the three-dimensional effect of dynamic security feature 404, despite dynamic security feature 404 and static security feature 406 being within the threshold proximity of the edge of security article 402.

As shown in FIG. 4B, and by reference number 408, based on rotating security feature 404 to the second orientation, the three-dimensional globe of the Earth appears (e.g., to a viewer) to shift. For example, the illumination (e.g., by sunlight) shifts from the north pole of the Earth to the south pole of the Earth. Dynamic security feature 404 is included in security article 402 to exogenously orient a viewer of security article 402 toward region 410 of security article 402, which includes dynamic security feature 404 and static security feature 406. In other words, dynamic security feature 404 is selected to catch the attention of the viewer even when region 410 is in the viewer's peripheral vision and to cause the viewer to inspect region 410 of security article 402 and, particularly, static security feature 406 in region 410.

As further shown in FIG. 4B, static security feature 406 may refer to a set of layers of color-changing ink. For example, static security feature 406 may include a set of interference filter pigment particles, a set of horizontally aligned magnetic pigment particles (e.g., aligned parallel to a substrate of security article 402). In this case, the set of horizontally aligned magnetic pigment particles may be magnetically aligned and/or cured before printing another set of magnetic pigment particles (e.g., of dynamic security feature 404), and/or before exposing security article 402 to another magnetic field to magnetically align the other set of magnetic pigment particles.

As shown, static security feature 406 appears as a first color at a first orientation in FIG. 4A and as a second color at a second orientation in FIG. 4B. Such a static security feature may be desired because the color-changing ink does not exhibit color loss in regions (e.g., edge regions) of the security feature that are tilted at high angles (e.g., angles of greater than approximately 10 degrees, greater than approximately 15 degrees, greater than approximately 20 degrees, or the like) relative to a substrate (e.g., of security article 402). Thus, static security feature 406 may exhibit improved color uniformity relative to dynamic security feature 404. Based on incorporating static security feature 406 within a proximity to dynamic security feature 404, the viewer's attention is directed by dynamic security feature 404 toward static security feature 406, thus reducing a likelihood that a viewer fails to inspect static security feature 406. In this way, a likelihood of a counterfeit version of security article 402 being passed off is reduced relative to another security article that does not include a dynamic security feature within a threshold proximity of a static security feature. Based on using dynamic security feature 404 to cause a viewer to inspect static security feature 406, a size of static security feature 406 may be reduced relative to another security article for which a static security feature is relatively large to independently catch the attention of a viewer. In this way, an amount of optically variable ink that is utilized to print static security feature 406 is reduced, thereby reducing a cost of security article 402.

Moreover, with regard to the three-dimensional illusion effect of dynamic security feature 404, the viewer may be caused to rotate security article 402 to inspect dynamic security feature 404 (e.g., to attempt to view the three-dimensional globe from another angle and see the movement of the illumination from the north pole to the south pole and/or from the south pole to the north pole), causing color-shifting to occur for static security feature 406. In this way, a likelihood that a viewer fails to inspect static security feature 406 because the viewer does not know that security article 402 includes a static color-shifting ink security feature at the location of static security feature 406 is reduced relative to another security article that includes a static color-shifting ink security feature without a dynamic security feature within a threshold proximity (e.g., overlapping, within one centimeter, within one millimeter, printed on top of, printed underneath of, printed adjacent to, or the like). Furthermore, based on the viewer focusing on dynamic security feature 404, static security feature 406 may appear to suddenly (i.e., within a threshold period of time and/or a threshold degree of tilt) change color, causing the viewer's attention to shift from inspecting dynamic security feature 404 to inspecting static security feature 406 and to associate static security feature 406 with being a security feature for inspection. In this way, including both a dynamic security feature 404 and a static security feature 406 within a threshold proximity in a security article improves a likelihood that a user inspects security article 402 to ascertain whether security article 402 is genuine relative to including only one of the security features or including the security features at separate locations of a security article.

As shown in FIG. 4C, security features 404 and 406 are printed onto security article 402. For example, security features 404 and/or 406 may be printed using a silk-screening procedure. As shown, dynamic security feature 404 includes a first region 404A that includes an optically variable magnetic ink exposed to a rotating magnetic field to form the parabolic convex Fresnel reflector that causes the three-dimensional effect. In some implementations, dynamic security feature 404 may include a particular material that includes magnetic particles to be aligned using a magnetic field. For example, dynamic security feature 404 may include a magnesium-fluoride/aluminum/magnetic core/aluminum/magnesium-flouride ($MgF_2$/Al/MC/Al/$MgF_2$) based ink. In some implementations, a curing procedure may be utilized to cause magnetic particles (e.g., of security features 404 and/or 406) to be fixed in a particular alignment. For example, after printing security ink of security feature 406, security article 402 may be exposed to a magnetic field to magnetically align magnetic particles of security feature 406, and may be exposed to ultra-violet (UV) light to cure the security ink and fix the magnetic particles in position. In some implementations, multiple curing procedures may be performed. For example, a first layer of security ink including magnetic particles may be printed, magnetically aligned, and cured, and a second layer of security ink including magnetic particles may be printed onto the first layer, magnetically aligned, and cured.

Dynamic security feature 404 includes a second region 404B of ink printed onto region 404A to form a pattern of continents on the parabolic convex Fresnel reflector (e.g., to cause dynamic security feature 404 to appear as a globe of the Earth). In this case, region 404A in printed with a blue magnetic ink to form "oceans" of the globe of the Earth, and region 404B is printed with a gold-to-green magnetic ink (e.g., an optically variable ink that shifts from gold to green at different orientations and includes magnetic particles) in a concentration of approximately 10% to 25%, approximately 15% to 20%, or the like. Both the blue magnetic ink of region 404A and the gold-to-green magnetic ink of region 404B are exposed to a rotating magnetic field and cured using UV light to cause the ink to form the parabolic convex Fresnel reflector and cause the three-dimensional illusion effect.

As shown, static security feature 406 is printed onto security article 402 to surround security feature 404, thus causing a viewer's attention toward dynamic security feature 404 to cause the viewer to inspect static security feature 406. In some implementations, static security feature 406 is printed using the same gold-to-green magnetic ink of region 404B. Static security feature 406 is not exposed to a magnetic field to magnetically orient particles, thus reducing a likelihood of color fading at edges of static security feature 406.

As indicated above, FIGS. 4A-4C are provided merely as an example. Other examples are possible and may differ from what was described with regard to FIGS. 4A-4C.

Figure 5:
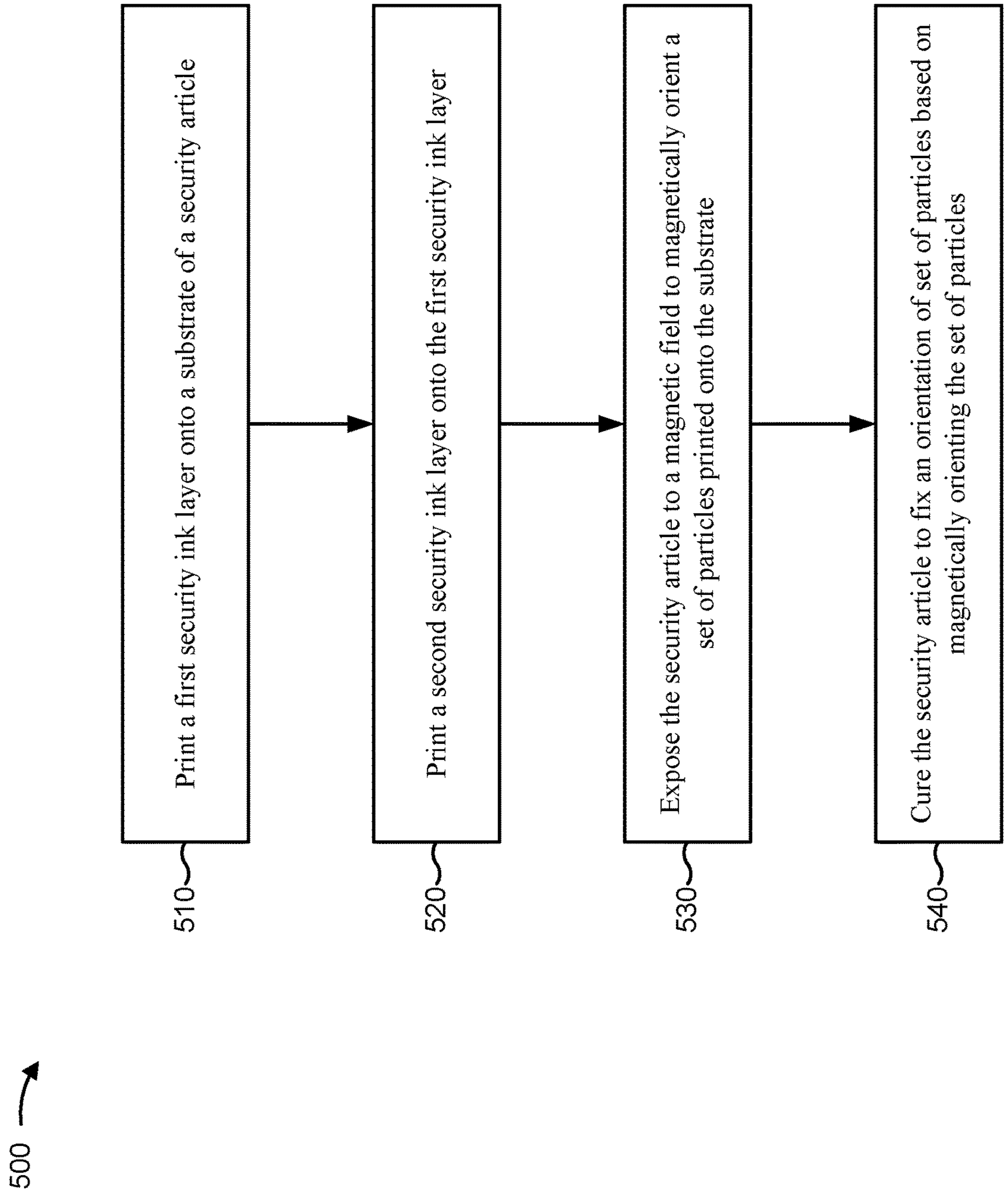
FIG. 5 is a diagram of an example process for manufacturing a metameric effect security article, as described herein.

FIG. 5 is a flow chart of an example process 500 for manufacturing a metameric effect security article.

As shown in FIG. 5, process 500 may include printing a first security ink layer onto a substrate of a security article (block 510). For example, the first security ink layer may be deposited, such as using a silk-screening procedure, onto the substrate. In some implementations, the first security ink layer may include a first set of particles, such as a set of magnetically orientable particles or the like. In some implementations, the first security ink layer may be associated with a first pigment concentration, such as between approximately 15% and approximately 20% by weight or the like, as described herein.

As further shown in FIG. 5, process 500 may include printing a second security ink layer onto the first security ink layer (block 520). For example, the second security ink layer may be deposited, such as using a silk-screening procedure, onto the first security ink layer. Additionally, or alternatively, the second security ink layer may be deposited onto the substrate of the security article. In some implementations, a first portion of the second security ink layer may be deposited onto the first security ink layer and a second portion of the second security ink layer may be deposited onto the substrate of the security article. In some implementations, the second security ink layer may include a second set of particles, such as a set of magnetically orientable particles or the like. In some implementations, the second security ink layer may be associated with a second pigment concentration, such as between approximately 7.5% and approximately 20% by weight or the like, as described herein.

In some implementations, the second security ink layer may include a pigment selected to be a metameric pair with another pigment of the first security ink layer. For example, a first pigment of the first security ink layer and a second pigment of the second security ink layer may be selected to have a substantially similar color-changing effect based on tilting the security article, as described herein. In some implementations, the first and second security ink layers may be deposited to form multiple security features. For example, the first (or multiple first) security ink layer(s) may be deposited to form a first, static security feature and the second (or multiple second) security ink layer(s) may be deposited to form a second, dynamic security feature, as described herein.

As further shown in FIG. 5, process 500 may include exposing the security article to a magnetic field to magnetically orient a set of particles printed onto the substrate (block 530). For example, the first security ink layer and/or the second security ink layer may be exposed to the magnetic field to magnetically orient the first set of particles or the second set of particles. In some implementations, the security article may be exposed to multiple magnetic fields, such as a first magnetic field (e.g., a two-axial magnetic field) to magnetically orient the first set of particles (e.g., approximately parallel to a surface of the substrate of the security article) and a second magnetic field (e.g., a rotation magnetic field) to magnetically orient the second set of particles (e.g., to create a parabolic Fresnel reflector). In this case, the first set of particles may be cured prior to exposing the security article to the second magnetic field.

As further shown in FIG. 5, process 500 may include curing the security article to fix an orientation of set of particles based on magnetically orienting the set of particles (block 540). For example, the first security ink layer and/or the second security ink layer may be exposed to an ultraviolet (UV) light to cure the first security ink layer and/or the second security ink layer. In this way, the magnetic orientation of the first set of particles and/or the second set of particles may be fixed into a static position.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In this way, a metameric effect security article is manufactured to include one or more security features, such as a dynamic security feature, a static security feature, a combination of a dynamic security feature and a static security feature, or the like. Based on including a static security feature within a threshold proximity of the dynamic security feature, a likelihood that a viewer fails to inspect the static security feature is reduced relative to the static security feature being printed at another location of the security article.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A security article, comprising:
a layer of security ink,
the layer of security ink including a set of color-shifting interference particles; and
a layer of magnetic color-shifting ink,
the layer of magnetic color-shifting ink including a set of magnetically aligned magnetic particles,
while at a first orientation of the security article, the layer of security ink being configured to appear as substantially a same color as a first portion of the layer of magnetic color-shifting ink, and
while at a second orientation of the security article, the layer of security ink being configured to appear as substantially a same color as a second portion of the layer of magnetic color-shifting ink, and the first portion being configured to appear brighter or darker than the second portion,
wherein the first portion is different from the second portion.

2. The security article of claim 1, wherein the layer of security ink and the layer of magnetic color-shifting ink are configured to exhibit a dynamic security feature when exposed to a light source,
wherein, while at the first orientation of the security article, the second portion is configured to appear as a bright portion of the dynamic security feature, and
wherein, while at the second orientation of the security article, the first portion is configured to appear as a bright portion of the dynamic security feature.

3. A security article, comprising:
a substrate;
a first layer of ink printed onto a first region of the security article; and
a second layer of ink printed onto a second region of the security article,
the second region being non-overlapping with the first region,
the first layer of ink and the second layer of ink being non-overlapping,
the second layer of ink including a set of magnetically aligned magnetic particles that are aligned with a direction of a magnetic field, and
a color-shifting property of the first layer of ink and a color-shifting property of the second layer of ink being configured to create a color matching effect,
wherein, while at a first orientation of the security article, the first layer of ink and a first portion of the second layer of ink are configured to create the color matching effect, and
wherein, while at a second orientation of the security article, the first layer of ink and a second portion of the second layer of ink are configured to create the color matching effect.

4. The security article of claim 3, wherein the first region and the second region are contiguous.

5. The security article of claim 3, wherein the first layer of ink is printed onto a first feature of the security article,
wherein the second layer of ink is printed onto a second feature of the security article, and
wherein the security article includes a metal layer between a portion of the first layer of ink and a portion of the second layer of ink.

6. The security article of claim 3, wherein an edge of the first layer of ink includes particles that are oriented non-parallel to the substrate.

7. The security article of claim 3, wherein the first layer of ink includes magnetic particles that are aligned substantially parallel to the substrate.

8. The security article of claim 3, wherein the magnetic field is a rotating magnetic field.

9. The security article of claim 3, wherein the second layer of ink includes a pigment concentration that causes the set of magnetically aligned magnetic particles to be separated by a distance.

10. The security article of claim 3, wherein a pigment concentration of pigment in the second layer of ink is 10% to 35% by weight.

11. The security article of claim 3, wherein a pigment concentration of pigment in the first layer of ink is 5% to 15% by weight.

12. The security article of claim 3, wherein the first layer of ink and the second layer of ink are configured to exhibit a dynamic security feature when exposed to a light source.

13. The security article of claim 3, wherein, while at the first orientation of the security article, the second portion of the second layer of ink is configured to appear as a bright portion of a dynamic security feature, and
wherein, while at the second orientation of the security article, the first portion of the second layer of ink is configured to appear as a bright portion of the dynamic security feature.

14. The security article of claim 3, wherein the first layer of ink comprises non-magnetic particles.

15. A security article comprising:
a dynamic feature comprising:
a first layer of ink, and
a second layer of ink printed on the first layer of ink; and
a static feature comprising a third layer of ink,
wherein the static feature includes a color-shifting security feature,
wherein the color-shifting security feature surrounds at least a portion of the dynamic feature, and
wherein the dynamic feature and the static feature are non-overlapping.

16. The security article of claim 15, wherein the dynamic feature is adjacent to the static feature.

17. The security article of claim 15, wherein the dynamic feature includes a metal layer that is between a portion of the first layer of ink and a portion of the second layer of ink.

18. The security article of claim 15, wherein the first layer of ink is a magnetic ink.

19. The security article of claim 15, wherein the static feature appears as a first color in a first orientation of the security article and as a second color in a second orientation of the security article.

20. The security article of claim 15, wherein, while at a first orientation of the security article, a first portion of the dynamic feature is configured to appear as a bright portion of the dynamic feature, and
wherein, while at a second orientation of the security article, a second portion of the dynamic feature is configured to appear as a bright portion of the dynamic feature.

* * * * *